(12) United States Patent
Presz-Lafreniere et al.

(10) Patent No.: US 12,203,594 B2
(45) Date of Patent: Jan. 21, 2025

(54) FIXTURE MOUNTING PLATE ASSEMBLY

(71) Applicant: GLOBE ELECTRIC COMPANY INC., Montreal (CA)

(72) Inventors: Christopher Presz-Lafreniere, Montreal (CA); Adam Chaimberg, Hampstead (CA); Xiong Xianwen, Montreal (CA); Scott Blaise Tylicki, Bowling Green, KY (US); Miles William McDonald, Bowling Green, KY (US)

(73) Assignee: GLOBE ELECTRIC COMPANY INC., Montreal (CA)

( * ) Notice: Subject to any disclaimer, the term of this patent is extended or adjusted under 35 U.S.C. 154(b) by 0 days.

(21) Appl. No.: 18/121,938

(22) Filed: Mar. 15, 2023

(65) Prior Publication Data

US 2024/0309991 A1  Sep. 19, 2024

(51) Int. Cl.
*F16M 13/02* (2006.01)
*F16B 2/02* (2006.01)

(52) U.S. Cl.
CPC ............... *F16M 13/02* (2013.01); *F16B 2/02* (2013.01)

(58) Field of Classification Search
CPC ........ F16M 13/02; F16M 13/027; F16B 2/02; F21S 8/026; F21S 8/043; F21S 8/036; F21V 21/044; F21V 21/045; F21V 21/047; F21V 21/14

USPC .......................................................... 248/200
See application file for complete search history.

(56) References Cited

U.S. PATENT DOCUMENTS

| | | | | |
|---|---|---|---|---|
| 2,965,348 A * | 12/1960 | Gerstel | .................. | F21V 21/04 |
| | | | | 220/3.6 |
| 4,250,540 A * | 2/1981 | Kristofek | ................ | F21V 21/04 |
| | | | | 362/404 |
| 10,132,477 B1 * | 11/2018 | Winters | ................... | F21V 21/14 |
| 10,267,503 B2 * | 4/2019 | Yu | ......................... | F21V 23/007 |
| 10,731,830 B2 * | 8/2020 | Feit | ........................ | F21S 8/036 |
| 10,989,398 B2 * | 4/2021 | Winters | ................ | F21V 23/001 |
| 2008/0023894 A1 * | 1/2008 | Nevers | .................... | F16F 1/025 |
| | | | | 267/102 |

\* cited by examiner

*Primary Examiner* — Christopher Garft
(74) *Attorney, Agent, or Firm* — Gray Ice Higdon

(57) ABSTRACT

A mounting plate assembly is disclosed having two or more spring clamp structures each being displaceably engageable with a respective guide slot formed on a rear face of the mounting plate. Each spring clamp structure has a spring support bracket provided with a bottom retention base displaceably retained captive by their guide slot. The spring support bracket may have a securing sleeve slidingly coupled thereto and displaceable along a vertical axis to the mounting plate. The spring support bracket may have a retention spring coupled thereto. The securing sleeve and the retention spring each have one or more arresting formations for retention coupling with selected ones of the two or more spaced-apart retention formations disposed spaced-apart along the guide slot when the support bracket is positioned over selected ones of the retention formations.

20 Claims, 6 Drawing Sheets

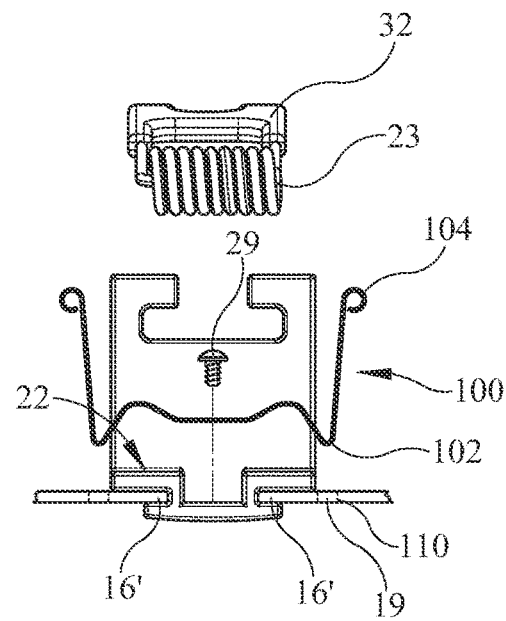
FIG. 8
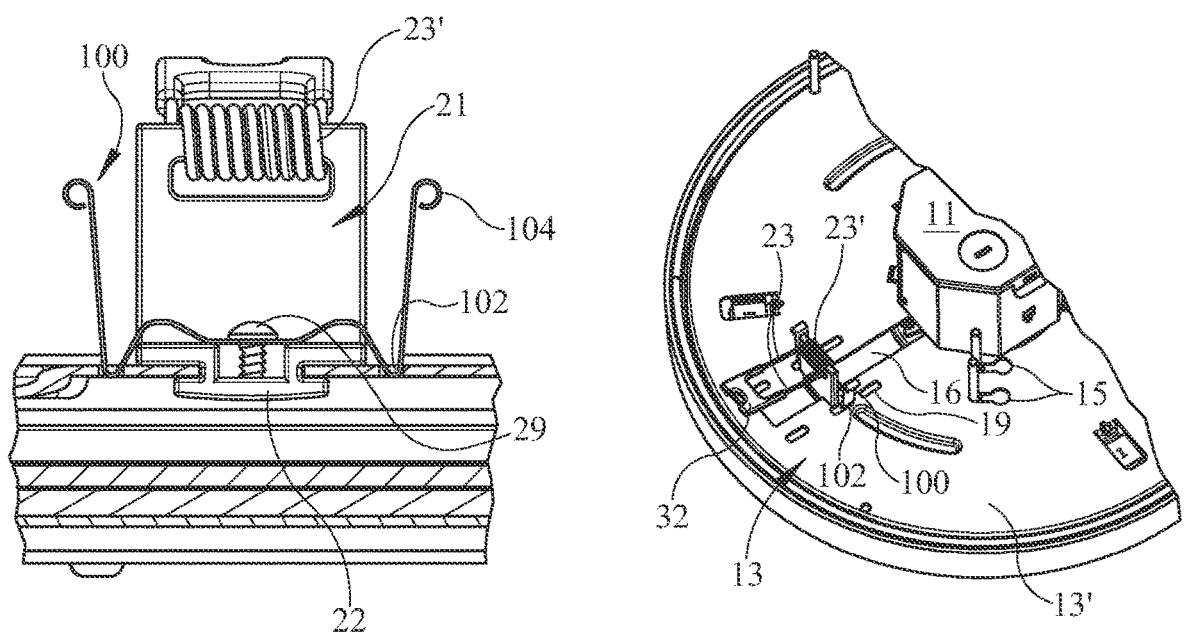
FIG. 9
FIG. 10

FIXTURE MOUNTING PLATE ASSEMBLY

BACKGROUND

The present disclosure relates to fixture mounting assemblies and more specifically to a mounting plate assembly for mounting light fixtures wherein a mounting plate and adjustable spring clamps permits the mounting of a light fixture to existing mounting holes of varying sizes formed in sheet material.

SUMMARY

It is one aspect of this disclosure to set forth a mounting plate assembly which can provide the above-mentioned needs for mounting fixtures in existing holes or holes of different sizes and wherein the mounting plate assembly is easy to assemble and install.

Another feature of the disclosure is to provide a mounting plate assembly which incorporates a novel spring clamp structure which is displaceably connectable to the mounting plate, without tools, by the use of a simple connecting base assembly requiring very few parts avoiding malfunctions.

Another feature of the disclosure is to provide a spring clamp structure for a mounting plate assembly wherein the spring support bracket and its securement structure for connection to the mounting plate may include only two molded and/or casted parts facilitating the assembly and reducing cost as well as preventing malfunctions of existing structures which are more complex in construction.

A further feature of the disclosure is to provide a spring support bracket which is easy to install on a fixture mounting plate and at different positions for mounting the mounting plate assembly in preformed holes of different sizes.

According to the above features, the disclosure provides a mounting plate assembly for mounting a fixture against holes of different sizes formed in sheet material. The mounting plate assembly has a mounting plate provided with an aperture to form a passage therethrough. A guide slot is formed on diametrically opposed sides of the aperture. A spring clamp structure is displaceably engageable with each guide slot on a rear face of the mounting plate. Two or more retention formations are formed in the mounting plate and disposed at predetermined spaced locations adjacent the guide slot. The spring clamp structure has a spring support bracket. The spring support bracket has a bottom retention base displaceably retained captive by the guide slot. Edges of the mounting plate may be received in slots of the bottom retention base, wherein receipt of the edges in the slots prevents vertical movement of the spring clamp structure. A spring biased clamp arm is secured to the spring support bracket.

The disclosure also provides a sliding sleeve which may surround the spring support bracket. The sliding sleeve has one or more arresting formations at a lower end thereof for retention coupling with selected ones of the two or more spaced-apart retention formations disposed spaced-apart along the guide slot. The support bracket is displaceable along the guide slot with the sliding sleeve disposed at a disengaged position. When the arresting formations of the sliding sleeve are aligned with two or more spaced-apart retention formations, the arresting formations may slide into engagement with the selected one of the two or more spaced-apart retention formations to arrest the spring support bracket at a selected position to retain the mounting plate against an existing hole of specific size.

The disclosure also provides a retention clip may be attached to the support bracket. The retention clip has one or more arresting formations for retention coupling with selected ones of the two or more spaced-apart retention formations disposed spaced-apart along the guide slot. The support bracket is displaceable along the guide slot with the retention clip disposed at a disengaged position. When the arresting formations of the retention clip are aligned with two or more spaced-apart retention formations, the retention clip's natural spring force urges the arresting formations to engage with two or more spaced-apart retention formations to arrest the spring support bracket at a selected position to retain the mounting plate against an existing hole of specific size. Force may be applied to moulded ends of the retention clip to lift the projecting edges out of the retention formations.

According to a further aspect of the disclosure there is provided a spring support bracket for securing a fixture mounting plate to a hole formed in sheet material. The spring support bracket is comprised of a vertical bridge arm having a mounting plate retaining spring secured to a trop end thereof. The vertical bridge arm has a bottom retention base configured to be slidingly coupled to a guide slot provided in the mounting plate. A slide member is slidingly coupled to the vertical bridge arm. The slide member has one or more arresting formations at a bottom end thereof for retention coupling of the vertical bridge arm with one or more retention formations formed in the mounting plate.

According to a still further aspect of the disclosure, the spring support bracket provided may be entirely displaced into and out of a guide slot of the mounting plate. The spring support bracket may be displaced into and out of the guide slot via rotational and vertical manipulation permitted by the bottom retention base width being narrower than the width of the guide slot. Rotation of the spring clamp structure can result in edges of the mounting plate disengaging with the slots of the bottom retention base. Disengagement of the edges of the mounting plate and the slots of the bottom retention base render the spring clamp structure vertically displaceable. It is appreciated that rotation, and accompanying vertical displacement, may be effected by engagement or disengagement of the sliding sleeve and/or retention clip mentioned previously, such that, for example, when either the sliding sleeve or the retention clip are engaged in a retention formation, rotation may be prohibited.

Therefore, consistent with one aspect of the invention, a mounting plate assembly is disclosed, the mounting plate assembly comprising of a mounting plate having an aperture to provide a passage therethrough, a guide slot on diametrically opposed sides of the aperture, a spring clamp structure displaceably engageable with each guide slot over a rear face of the mounting plate, two or more retention formations in the mounting plate disposed at predetermined spaced locations adjacent to the guide slots. The spring clamp structure may have a spring support bracket, the spring support bracket having a bottom retention base displaceably retained captive by the guide slot. A spring biased clamp arm may be secured to the spring support bracket, the spring support bracket having a securing sleeve slidingly couplable to the spaced-apart retention formations, the securing sleeve having one or more arresting formations at a lower end thereof for retention coupling with selected ones of the two or more spaced-apart retention formations disposed spaced-apart along the guide slot. The spring support bracket may be displaceable along the guide slot with the securing sleeve disposed at a disengaged position. The spring support bracket being securable along the guide slot with the securing sleeve disposed at an engageable position, wherein the securing sleeve is at an engageable position when the arresting formations are engageable with two or more spaced-apart retention formations, and wherein the securing sleeve has two or more spaced-apart retention formations to secure the spring support bracket at a selected position to retain the securing sleeve at the selected position.

In some embodiments, the spring support bracket is comprised of a vertical bridge arm, wherein the securing sleeve being a sliding retention sleeve slidingly received by the vertical bridge arm. Also, in some embodiments, the one or more arresting formations are formed in a bottom end of the sliding retention sleeve for removable coupling with a selected one of the two or more spaced-apart retention formations. Moreover, in some embodiments the vertical bridge arm is a flat substantially rectangular mounting plate bridge arm.

In addition, in some embodiments the sliding retention sleeve is dimensioned for close vertical sliding fit about the flat substantially rectangular mounting plate bridge arm. In some embodiments the retention formations are spaced-apart retention holes formed on opposed sides of the slot. In some embodiments the one or more arresting formations are constituted by a pair of downwardly projecting knobs formed in a bottom edge of the sliding retention sleeve with the projecting knobs disposed spaced-apart for engagement with a selected pair of the pairs of spaced-apart retention holes. Further, in some embodiments the sliding retention sleeve is formed with a finger engaging projection.

Moreover, in some embodiments the pair of spaced-apart retention formations and the pair of projecting knobs are shaped for close retention engagement with one another. In some embodiments, the bottom retention base of the spring support bracket includes a sliding support platform formation having a pair of slots for captive displacement in the guide slot, with each slot of the pair of slots receiving an edge portion of the mounting plate on opposed sides of the guide slot. In some embodiments, the bottom retention base is rotationally engageable and/or disengageable with the projecting edge portions received in the pair of slots. Additionally, in some embodiments, disengagement of the projecting edge portions of the mounting plate with the pair of slots permits displacement of the spring clamp structure.

Further, in some embodiments the flat rectangular mounting plate has a spring retention slot formed in a top portion thereof for retention of a torsion spring at an elevated position above the rear surface of the mounting plate, the torsion spring having a clamp arm section integrally formed therewith and extending downwardly spring biased against the rear face of the mounting plate towards an outer end edge of the mounting plate. In some embodiments, the clamp arm section is formed by straight spring arms sections at opposed ends of the torsion spring extending parallel to one another in a common plane and interconnected to one another at a free end by a surface engaging pad structure. In some embodiments, the flat substantially rectangular mounting plate bridge arm and the sliding sleeve are molded and/or casted parts. In some embodiments, the mounting plate is further provided with junction box attachment slots disposed on two spaced apart circumferential axis spaced from the aperture to provide connection to junction boxes of two different diameters for connection thereto by screw fasteners.

Consistent with another aspect of this invention, a mounting plate assembly is disclosed, the mounting plate assembly comprising a mounting plate, two or more guide slots, two or more retention formations in the mounting plate disposed at spaced locations adjacent to the guide slots, and two or more spring clamp structures. Each spring clamp structure may be displaceably engageable with a guide slot over a rear face of the mounting plate, the spring clamp structure having a spring support bracket, the spring support bracket having a bottom retention base displaceably retained captive in the guide slot. The bottom retention base can include a pair of slots for captive displacement in the guide slot, each slot of the pair of slots receiving an edge portion of the mounting plate on opposed sides of the guide slot, the spring support bracket having a retention member couplable to the spaced-apart retention formations, the retention member having one or more arresting formations extending from an end thereof for retention coupling with selected one or more spaced-apart retention formations disposed along the guide slot. The spring support bracket may be displaceable along the guide slot with the retention member disposed at a disengaged position, the spring support bracket being securable along the guide slot with the retention member disposed at an engageable position, wherein the retention member is at an engageable position when the arresting formations are engageable with two or more spaced-apart retention formations.

In some embodiments, the retention member partially envelopes a vertical bridge arm of the spring support bracket, the retention member being slidingly received by the vertical bridge arm, and the one or more arresting formations being formed in a bottom end of the retention member for removable coupling with a selected one of the two or more spaced-apart retention formations.

Consistent with a further aspect of this invention, a mounting plate assembly, comprising a mounting plate, a guide slot, and a spring clamp structure displaceably engageable with the guide slot over a rear face of the mounting plate. The spring clamp structure may have a bottom retention base displaceably retained captive by the guide slot, wherein the bottom retention base of the spring support bracket includes a sliding support platform formation having a pair of slots for captive displacement in the guide slot, with each slot of the pair of slots receiving an edge portion of the mounting plate on opposed sides of the guide slot. The bottom retention base may be rotationally engageable and/or disengageable with the projecting edge portions received in the pair of slots, wherein disengagement of the projecting edge portions of the mounting plate with the pair of slots permits vertical displacement of the spring clamp structure.

In some embodiments the mounting assembly further comprises a spring support bracket of the spring clamp structure, the spring support bracket having a retention member couplable to the spaced-apart retention formations, the retention member having one or more arresting formations extending from an end thereof for retention coupling with selected one or more spaced-apart retention formations disposed along the guide slot. The spring support bracket may be displaceable along the guide slot with the retention member disposed at a disengaged position, the spring support bracket being securable along the guide slot with the retention member disposed at an engageable position, wherein the retention member is at an engageable position when the arresting formations are engageable with two or more spaced-apart retention formations.

Consistent with yet another aspect of this invention, a spring support bracket is disclosed, the spring support bracket comprising a bridge arm having a mounting plate retaining spring secured to a top end thereof, the vertical bridge arm having a bottom retention base slidingly couplable to a guide slot provided in a mounting plate, and a retention clip coupled to the bottom retention base, the retention clip having one or more arresting formations for retention coupling of the bottom retention base with one or more retention formations formed in the mounting plate.

In some embodiments, the bottom retention base of the spring support bracket includes a sliding support platform formation having a pair of horizontally aligned slots for captive displacement in the guide slot wherein the spring support bracket is retained in captive sliding displacement along the guide slot when the projection edge portions are received in the horizontally aligned slots. In some embodiments, the bottom retention base is rotationally engageable and/or disengageable with the projecting edge portions received in the pair of horizontally aligned slots. In some embodiments, rotation resulting in full disengagement of the projecting edge portions of the mounting plate with the pair of horizontally aligned slots permits vertical displacement of the spring clamp structure.

Further, in some embodiments the retention clip exerts a natural spring force urging arresting formations of the retention clip downward. Additionally, in some embodiments the retention clip includes moulded portions on opposing portions of the retention clip, the opposing portions being distal from a coupling of the retention clip and the bottom retention base. In some embodiments, the moulded portions are ergonomically contoured for engagement with one or more fingers. In some embodiments, the vertical bridge arm is a flat substantially rectangular mounting plate bridge arm, the retention clip being dimensioned for placement about the flat substantially rectangular mounting plate bridge arm. Moreover, in some embodiments the retention formations are spaced-apart retention holes formed on opposed sides of the slot with the retention holes being disposed in transverse alignment with one another to form pairs of spaced-apart retention holes.

Additionally, in some embodiments the retention clip is dimensioned about the flat rectangular mounting plate to urge into a selected one of the pair of holes when disposed thereover. In some embodiments the arresting formations are constituted by a pair of angled formations of the retention clip, with arresting formations disposed spaced-apart for engagement with a selected pair of the pairs of spaced-apart retention holes. In some embodiments, the flat substantially rectangular mounting plate bridge arm and the retention clip are molded and/or casted parts. In some embodiments, the mounting plate is for mounting one of a light fixture, a motion detecting device, a camera or combinations thereof in the hole formed in sheet material. In some embodiments, the retention clip is integrally attached to the bottom retention base with a screw. In some embodiments, the retention clip is integrally molded and/or casted to the bottom retention base. Further, in some embodiments, the vertical bridge arm and bottom retention base are integrally formed.

Consistent with an another aspect of this invention spring support bracket is disclosed, the spring bracket comprising a mounting plate retaining spring and a retention base slidingly couplable to a guide slot provided in a mounting plate, the retention base including a sliding support platform formation having a pair of slots for captive displacement in the guide slot, with each slot of the pair of slots receiving an edge portion of the mounting plate on opposed sides of the guide slot. A retention clip may be coupled to the retention base, the retention clip having one or more arresting formations for retention coupling of the retention base with one or more retention formations formed in the mounting plate, wherein the retention base is rotationally engageable and/or disengageable with the projecting edge portions received in the pair of slots when the retention base is not coupled.

In some embodiments, disengagement of the projecting edge portions of the mounting plate with the pair of slots permits vertical displacement of the spring clamp structure.

Consistent with a further aspect of this invention a spring support bracket is disclosed, the spring bracket comprising a mounting plate retaining spring secured to a top end of the spring support bracket, a bottom retention base secured to a bottom end of the spring support bracket, the bottom retention base slidingly couplable to a guide slot provided in a mounting plate, a bridge arm connecting the top end and the bottom end of the spring support bracket, and a retention formation coupled to the bottom retention base, the retention formation having one or more arresting formations for retention coupling of the bottom retention base with one or more retention formations formed in the mounting plate, the retention formation including a pair of opposing contoured ends facilitating disengagement of the arresting formations from the retention formation when the contoured ends are brought together.

In some embodiments, the bottom retention base includes a sliding support platform formation having a pair of slots for captive displacement in the guide slot, with each slot of the pair of slots receiving an edge portion of the mounting plate on opposed sides of the guide slot, the bottom retention base being rotationally engageable and/or disengageable with the projecting edge portions received in the pair of slots, and disengagement of the projecting edge portions of the mounting plate with the pair of slots permiting displacement of the spring clamp structure.

Consistent with an aspect of this invention, a spring support bracket is disclosed, the spring support bracket comprising a vertical bridge arm having a mounting plate retaining spring secured to a top end thereof, the vertical bridge arm having a bottom retention base configured to be slidingly coupled to a guide slot provided in the mounting plate, and a slide member slidingly coupled to the vertical bridge arm, the slide member having one or more arresting formations at a bottom end thereof for retention coupling of the vertical bridge arm with one or more retention formations formed in a mounting plate.

In some embodiments, the bottom retention base of the spring support bracket includes a sliding support platform formation having a pair of horizontally aligned slots for captive displacement in the guide slot, with each slot of the pair of horizontally aligned slots receptive in close sliding fit therein a projecting edge portion of the mounting plate on opposed sides of the guide slot wherein the spring support bracket is retained in captive sliding displacement along the guide slot when the projection edge portions are received in the horizontally aligned slots.

Moreover, in some embodiments, the bottom retention base is rotationally engageable and/or disengageable with the projecting edge portions received in the pair of horizontally aligned slots. In some embodiments, rotation resulting in full disengagement of the projecting edge portions of the mounting plate with the pair of horizontally aligned slots permits vertical displacement of the spring clamp structure.

Further, in some embodiments the vertical bridge arm is a flat substantially rectangular mounting plate bridge arm, the sliding retention sleeve being dimensioned for vertical sliding fit about the flat rectangular mounting plate bridge arm. In some embodiments, the retention formations are spaced-apart retention holes formed on opposed sides of the slot with the retention holes being disposed in transverse alignment with one another to form pairs of spaced-apart retention holes. In some embodiments, the one or more arresting formations are constituted by a pair of downwardly projecting knobs formed in a bottom edge of the sliding retention sleeve with the projecting knobs disposed spaced-apart for engagement with a selected pair of the pairs of spaced-apart retention holes. Further in some embodiments, the sliding retention sleeve is dimensioned for free sliding fit about the flat rectangular mounting plate wherein to be engageable with a selected one of the pair of holes when disposed thereover.

In some embodiments, the sliding retention sleeve is formed with a finger engaging projection to facilitate the vertical displacement thereof to position the vertical bridge arm at the disengaged position to displace the projecting knobs above the back face of the mounting plate and above the spaced-apart retention holes. In some embodiments, the flat substantially rectangular mounting plate bridge arm and the sliding sleeve are casted and/or molded parts. In some embodiments, the mounting plate assembly is for mounting one of a light fixture, a motion detecting device, a camera or combinations thereof in the hole formed in sheet material. In some embodiments, the vertical bridge arm and bottom retention base are integrally formed.

Additionally, in some embodiments, the vertical bridge arm has a spring retention slot for securing the retaining spring. In some embodiments, the retaining spring includes a torsion spring wrapping about the spring retention slot of the vertical bridge arm. In some embodiments, the retaining spring is formed by straight spring arms sections at opposed ends of the torsion spring extending parallel to one another in a common plane and interconnected to one another at a free end by a surface engaging pad structure. In some embodiments, the mounting plate is circular or rectangular.

Consistent with a further aspect of this invention, a spring support bracket is disclosed, the spring support bracket comprising a mounting plate retaining spring secured to a top end of the spring support bracket, a bottom retention base secured to a bottom end of the spring support bracket, the bottom retention base configured to be slidingly coupled to a guide slot provided in the mounting plate, a vertical bridge arm connecting the top end and the bottom end of the spring support bracket, and a member slidingly coupled to the vertical bridge arm, the member having one or more arresting formations for retention coupling of the spring support bracket to one or more positions in the guide slot with one or more retention formations formed in a mounting plate.

In some embodiments, the retention base includes a sliding support platform formation having a pair of slots for captive displacement in the guide slot, with each slot of the pair of slots receiving an edge portion of the mounting plate on opposed sides of the guide slot, the retention base being rotationally engageable and/or disengageable with the projecting edge portions received in the pair of slots, and disengagement of the projecting edge portions of the mounting plate with the pair of slots permitting displacement of the spring clamp structure.

Consistent with an aspect of this invention, a spring support bracket is disclosed, the spring support bracket comprising a mounting plate retaining spring, a retention base slidingly couplable to a guide slot provided in a mounting plate, the retention base including a sliding support platform formation having a pair of slots for captive displacement in the guide slot, with each slot of the pair of slots receiving an edge portion of the mounting plate on opposed sides of the guide slot, a vertical bridge arm connecting the retaining spring and the retention base. A slide member may be slidingly coupled to the vertical bridge arm, the slide member having one or more arresting formations at a end thereof for retention coupling of the spring support bracket to one or more positions in the guide slot with one or more retention formations formed in a mounting plate, wherein the retention base is rotationally engageable and/or disengageable with the projecting edge portions received in the pair of slots when the retention base is not coupled.

In some embodiments, the retention base is vertically displaceable when disengaged with the projecting edge portions.

BRIEF DESCRIPTION OF THE DRAWING

Multiple embodiments of the disclosure will now be described with reference to the accompanying drawings in which:

FIG. 8 is a front fragmented view of the vertical bridge arm showing its sliding engagement in a guide slot, featuring a retention clip;

FIG. 9 is a side view showing the spring support bracket with the retention clip in front of the vertical bridge arm at an engaged position in a selected pair of retention holes formed at spaced-apart intervals along the guide slot; and FIG. 10 is a fragmented top perspective view of an end section of the mounting plate assembly, featuring a retention clip.

DETAILED DESCRIPTION

Before any embodiments of the application are explained in detail, it is to be understood that the application is not limited to the details of construction and the arrangement of component part set forth in the following description or illustrated by the following drawings. Further, it is to be understood that the phraseology and terminology used herein is for the purpose of description and should not be regarded as limiting but should encompass equivalents thereof.

Figure 1:
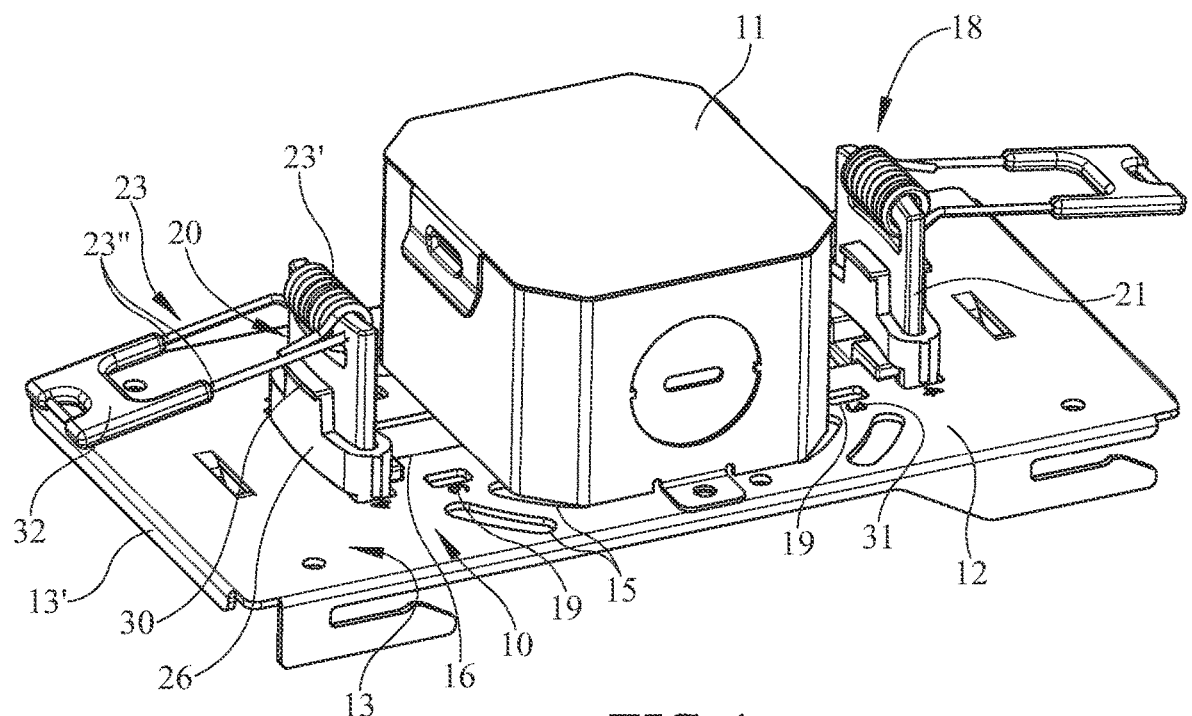
FIG. 1 is a perspective view of the light fixture mounting plate assembly on which there is shown an electrical junction box positioned on the rear surface thereof as well as two spring clamp structures featuring retention sleeves.
Figure 2:
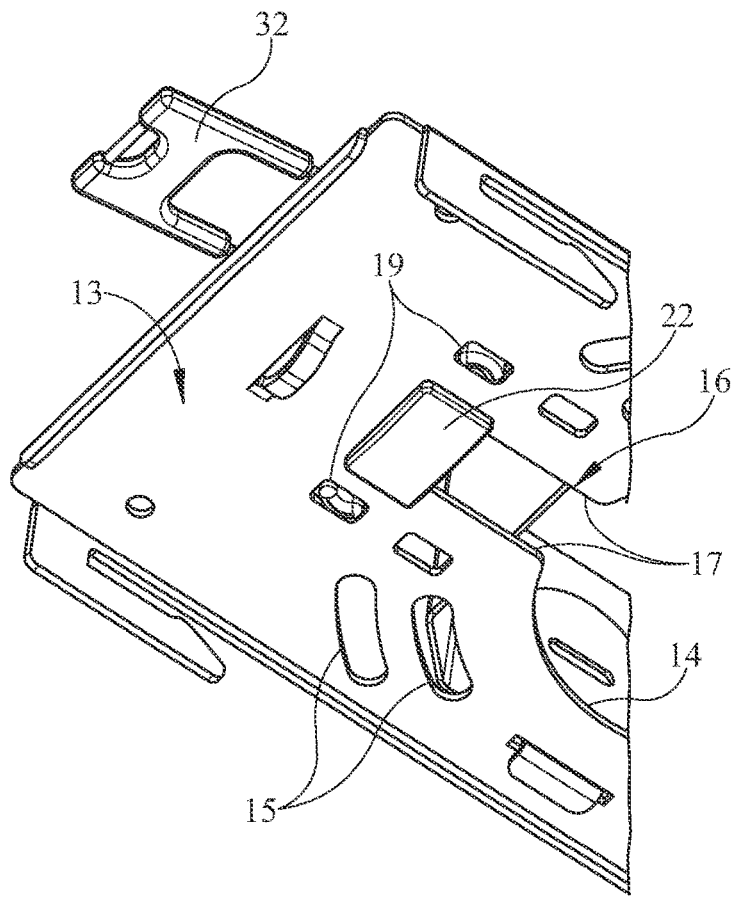
FIG. 2 is a fragmented perspective view of the front surface of the mounting plate assembly.

Referring now to the drawings, and more particularly to FIGS. 1 and 2, there is shown generally at 10 the mounting plate assembly of the disclosure for mounting fixtures, herein light fixtures, in existing holes of different sizes formed in sheet material, as described in more detail in the above referenced co-pending application. Although the mounting plate assembly described and illustrated herein is for the mounting of light fixtures, it should not be limited thereto as other type fixtures such as motion detectors, cameras or light fixtures combined with such other devices may be secured to the mounting plate assembly of the disclosure.

As herein shown, in one application of the mounting plate assembly, an electrical junction box 11 may be secured to the rear face 12 of the mounting plate 13 and disposed over an aperture 14 which provides access to the interior of the junction box to effect wiring connections, and such is well known and described in more detail in the above mentioned pending patent application. The mounting plate 13 is further provided with junction box attachment slots 15 disposed on two or more spaced apart circumferential axis spaced from the aperture 14 to provide connection to junction boxes of two different diameters by the use of screw fasteners.

The mounting plate 13 is formed with a pair of guide slots 16 disposed on diametrically opposed sides of the aperture 14, only one being shown herein but obvious to a person skilled in the art. As better seen from FIG. 2, the guide slot 16 is a straight slot defining opposed parallel plate side edges 17. A spring clamp structure 18 is displaceably engageable with each of the guide slots 16 over the rear face 12 of the mounting plate 13.

At least two retention formations in the form of spaced-apart retention holes 19 formed in the mounting plate 13 and disposed at predetermined spaced locations adjacent the guide slot 16. As illustrated, retention holes 19 can be disposed in straight alignment with one another and spaced parallel to the side edges 17 of the guide slot 16.

Retention holes 19 may be located, shaped, and/or spaced in alternative configurations that would be appreciated by one having ordinary skill in the art. For example, the retention holes 19 may be located and/or placed in configurations permitting the spring clamp structure 18 to be positioned and secured in the guide slot 16 at angles not depicted in the Figures.

With additional reference to FIGS. 3 to 6, the spring clamp structure 18 is formed by a spring support bracket 20 having a vertical bridge arm 21 having a bottom retention base 22 integrally formed at a lower end thereof and shaped for captive displaceable retention with an associated guide slot 16. A spring biased clamp arm 23 has a torsion spring 23' secured in a retention slot 24 formed at a top end 25 of the vertical bridge arm 21. The clamp arm 23 is formed by straight spring arms sections 23" projecting from opposed ends of the torsion spring 23' and extend parallel to one another in a common plane and are interconnected to one another at a free end by a surface engaging pad structure 32. The clamp arm sections 23" extend downwardly spring biased against the rear face of the mounting plate 13 towards an outer end edge 13' of the mounting plate.

A slide member in the form of a sliding retention sleeve 26 is disposed about the vertical bridge arm 21 and is slidingly displaceable there along above the rear face 12 of the mounting plate 13. The sliding retention sleeve 26 has one or more arresting formations in the form of a pair of downwardly projecting knobs 27 formed in a bottom edge 28 for retention coupling with selected ones of the two retention holes 19 disposed in spaced-apart transverse alignment to form pairs of retention holes 19 along the guide slot 16.

The sliding sleeve/securing sleeve 26 fixedly retains the support bracket 20 in position by inserting the projecting knobs/posts 27 into a selected pair of retention holes 19 dependent on the size of the existing hole to which the mounting plate 13 is to be secured. Substantially inverted embodiments of those described herein, such as an embodiment in which the sliding sleeve/securing sleeve 26 may alternatively or additionally have a select pair of retention holes 19 which are brought to surround posts 27 which may protrude from the mounting plate 13, would be appreciated by one having ordinary skill in the art. The projecting knobs 27 and/or retention holes 19 may have a smooth surface. The sliding sleeve 26 does not require tools be fixed into position on the mounting plate. The projecting knobs/posts 27 can be frictionally engaged within the retention holes 19. Frictional engagement between components may be facilitated and/or aided by malleable materials components are constructed of. For example, it is appreciated that the malleability of a plastic composition may effect frictional engagement relative to malleability of a metal composition. In other implementations, the projecting knobs can have outwardly extending abutments which retain the sleeve in position.

The bottom retention base 22 is a sliding support platform formation formed integral with the vertical bridge arm 21 and is provided with a pair of horizontally aligned slots or channels 22' disposed on opposed sides thereof for close captive sliding displacement along the guide slot 16. Each slot 22' of the pair of horizontally aligned slots may receive a projecting edge portion 16' of the mounting plate 13 on opposing sides of the guide slot 16. (See FIG. 4). The spring support bracket 20 is retained in captive sliding displacement along the guide slot 16 when the edge portions 16' of the mounting plate 13 are received in the bottom retention base's 22 slots 22'. Sliding displacement along the guide slot 16 does not require tools, though it is appreciated that sliding displacement may require the sliding sleeve 26 to be disengaged from the retention holes 19.

The vertical bridge arm 21 is formed as a substantially flat and substantially rectangular mounting plate bridge arm, and the sliding retention sleeve 26 surrounds the rectangular mounting plate bridge arm and is dimensioned for close vertical sliding fit thereabout. It is appreciated that the vertical bridge arm 21 may be contoured and/or curved in one or more locations and have deviations in thickness effecting the exact topology and geometry of the vertical bridge arm 21. The retention holes 19, formed on opposed sides of the guide slot 16 as well as the guide slots 16, are formed by metal punching the metal mounting plate 13. The retention holes 19 are of rectangular shape as well as the projecting knobs 27 to provide a firm connection but could also be of a different shape providing the same result. The securing sleeve 26 is also formed with a finger engaging projection 30 to facilitate engagement and/or disengagement by a user person's fingers. Sufficient force in a direction by a user on the finger engaging projection 30 can result in engagement or disengagement of the securing sleeve 26.

The assembly of the spring clamp structure 18 to the mounting plate 13 is a very simple procedure by placing the sliding retention sleeve 26 upwards on the vertical bridge arm 21 to position the projecting knobs above the back face of the mounting plate and the spaced-apart retention holes and at the same time engaging the slots 22' of the base with guide slot 16 through the aperture 14. The spring clamp structure 18 is then slidingly displaced to a position over a selected one of the pairs of retention holes 19 and the sliding retention sleeve is released with the arresting knobs 27 free falling into the selected pair of retention holes 19. If the arresting knobs 27 are not perfectly aligned with the retention holes 19 the vertical bridge arm 21 is slightly displaced in the area of the selected retention holes 19 until the arresting knobs free fall into the retention holes 19. In order to facilitate engaging the spring clamp bracket structures 18 with the same pair of retention holes 19 in the opposed guide slots, the pairs of retention holes 19 may be provided with identification markings 31 to facilitate positioning the spring clamp structure 18 at the same spacing on opposed sides thereof.

Figure 2A:
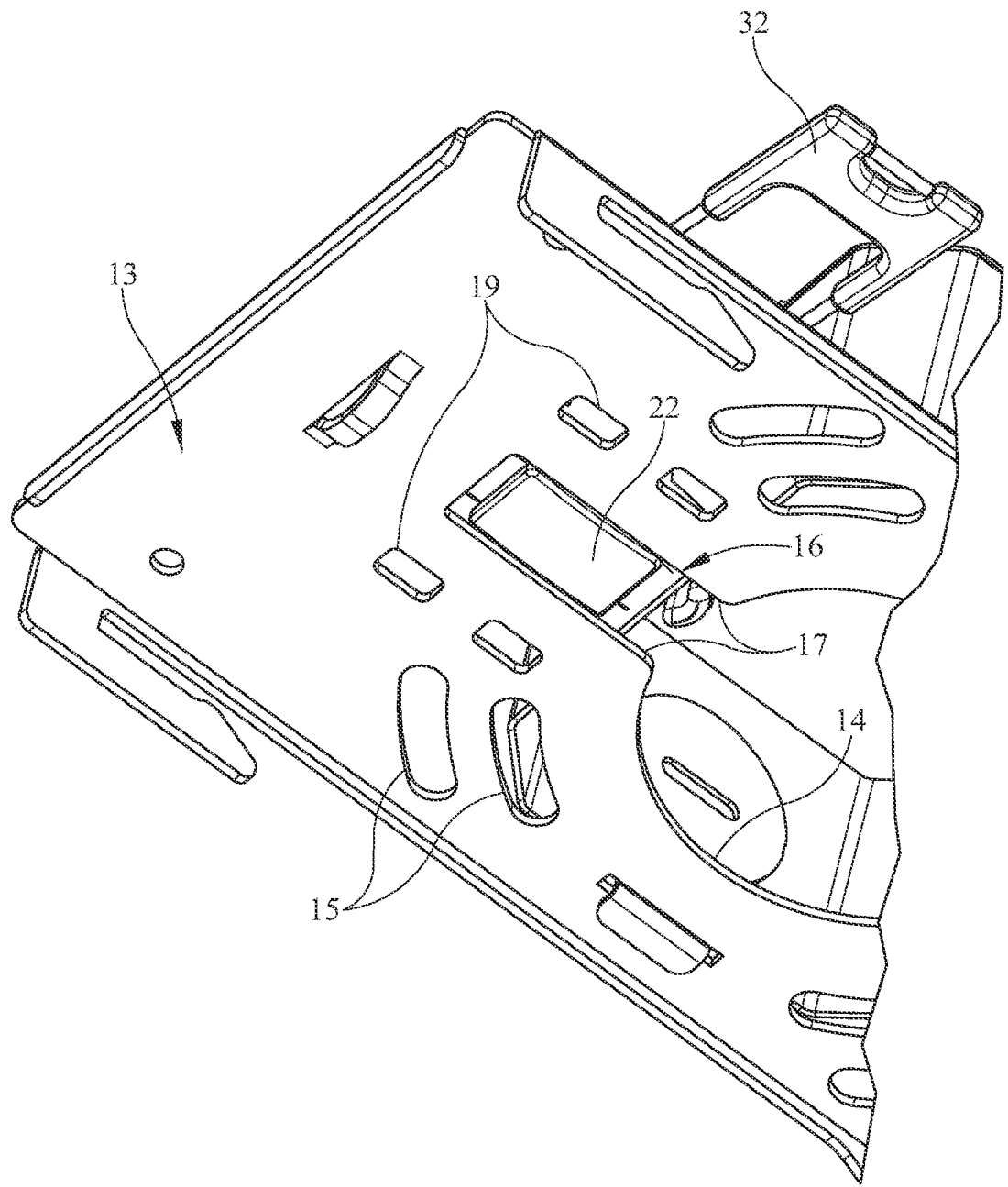
FIG. 2A is a fragmented perspective view of the front surface of the mounting plate assembly, depicting a rotated spring clamp structure.
Figure 3:
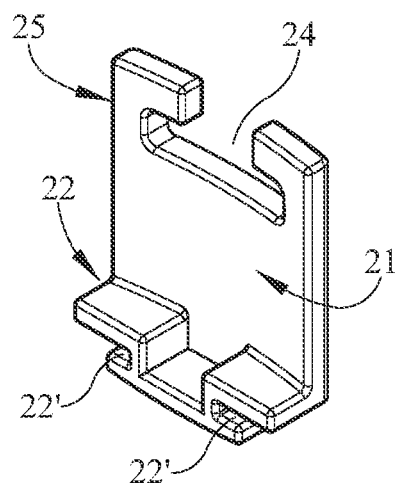
FIG. 3 is a perspective view of the vertical bridge arm of the spring support bracket.
Figure 4:
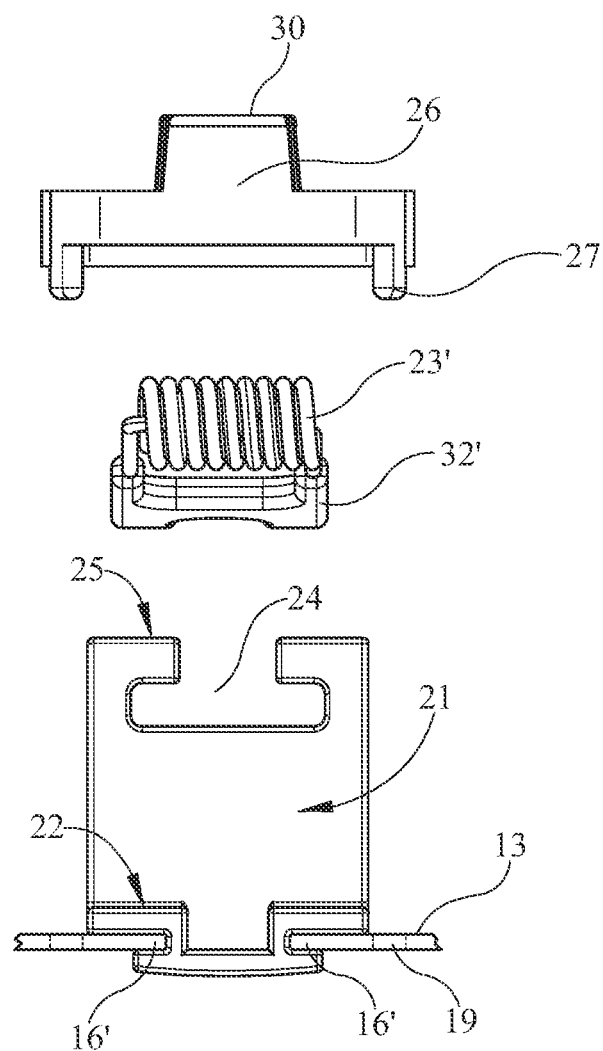
FIG. 4 is a front fragmented view of a vertical bridge arm featuring a retention sleeve, showing its sliding engagement in a guide slot.
Figure 5:
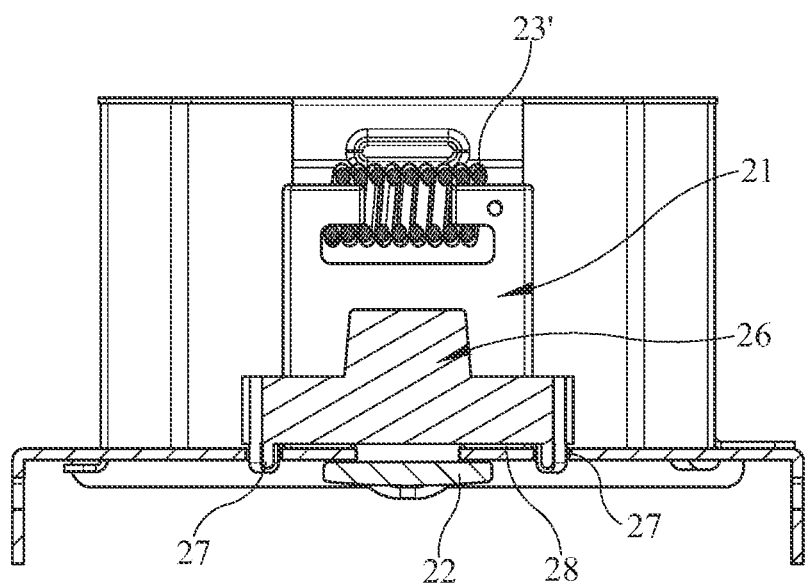
FIG. 5 is a front view showing the spring support bracket with the sliding retention sleeve disposed about the vertical bridge arm at an engaged position in a selected pair of retention holes formed at spaced-apart intervals along the guide slot.
Figure 6:
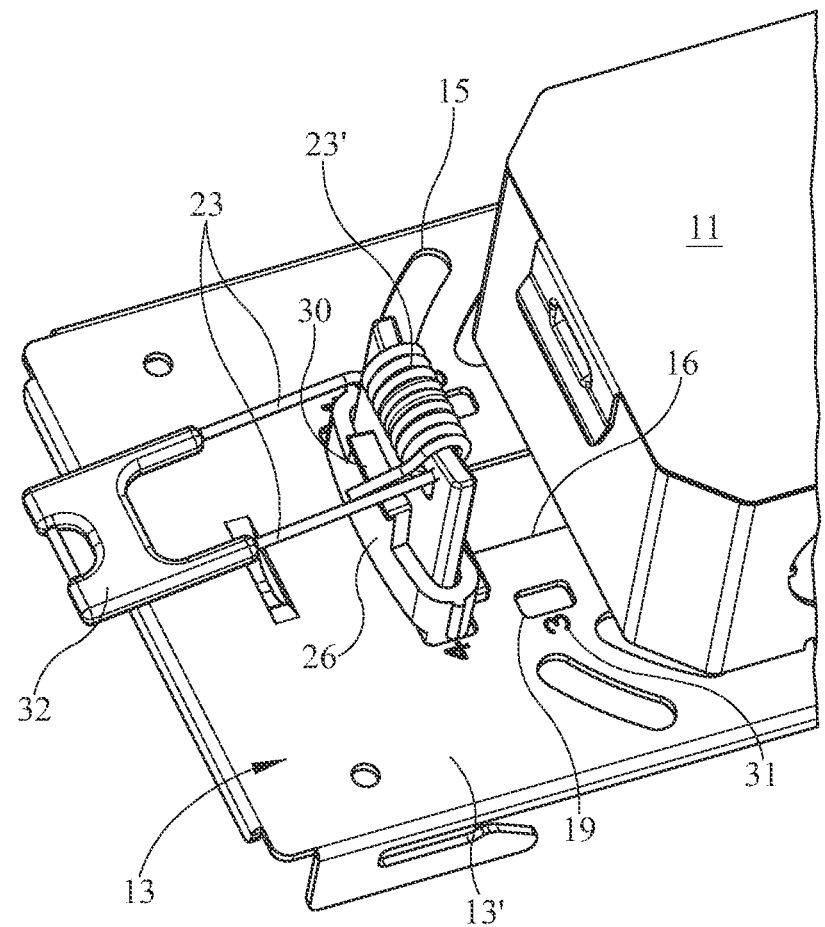
FIG. 6 is a fragmented top perspective view of an end section of the mounting plate assembly, featuring a retention sleeve.

As depicted in FIG. 2A, the spring clamp structure 18 may have dimensions permitting vertical displacement into and out of a guide slot 16 via rotational and vertical manipulation.

Referring to FIGS. 2 and 2A, the spring clamp structure 18 may be manipulated into a guide slot 16 by substantially aligning the lengthwise axis of the bottom retention base 22 over the lengthwise axis of the guide slot 16, then vertically aligning the base slots 22' with edges of the mounting plate 16', and subsequently rotating the spring clamp structure 18 such that the base slots 22' receive the mounting plate edges 16', preventing vertical manipulation of the spring clamp structure 18 from the guide slot 16. Stated differently, the bottom retention base 22 may be rotatable about a vertical axis, wherein the vertical axis is perpendicular to a lateral (widthwise) axis of the guide slot 16 and originates at a center (midpoint) of the lateral axis of the guide slot 16, wherein the lateral axis extends from side edge 17 to side edge 17 of the guide slot 16, and wherein the rotation may result in increased engagement or disengagement of the projecting edge portions with the pair of slots. In some implementations the slots can be horizontally aligned as depicted in some embodiments. In other embodiments the slots can be offset either horizontally or vertically as design constraints require.

The spring clamp structure 18 may be manipulated from a guide slot 16 by rotating the spring clamp structure's 18 lengthwise axis into substantial alignment with the guide slot's 16 lengthwise axis, such that the edges 16' of the mounting plate 13 are no longer received in the bottom retention base 22 slots 22', then vertically manipulating the spring clamp structure 18 from the guide slot 16.

Figure 7:
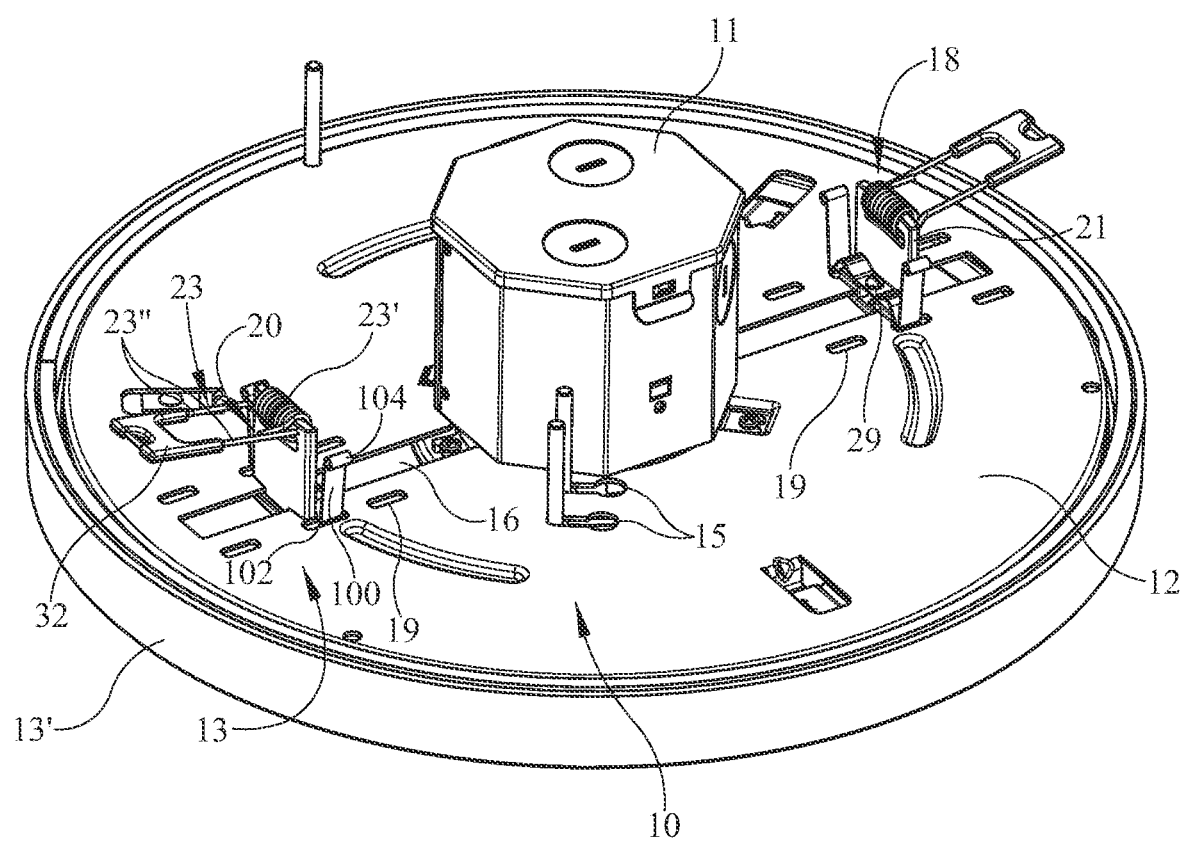
FIG. 7 is a perspective view of the light fixture mounting plate assembly on which there is shown an electrical junction box positioned on the rear surface thereof as well as two spring clamp structures, featuring a retention clip.

FIG. 7 depicts another embodiment for retaining the spring clamp structure into fixed position on the mounting plate. For example, while the sleeve 26 disclosed above acts as to removably fix in position the spring clamp structure into predetermined positions on the mounting plate without the requirement of tools or other implements. Other fixation devices may be utilized that similarly do not require the use of tools. Further, as noted herein, the mounting plate assembly 10 is not limited to a specific size or shape, such as the example depicted in FIG. 1. Accordingly, FIG. 7 depicts a circular embodiment of the mounting plate assembly 10.

FIG. 7 also depicts an alternative implementation of a tool-less design for fixating the claim in position by utilization of a retention clip 100 being used in place of the sliding sleeve/securing sleeve 26. It is appreciated that although the retention clip 100 depicted in FIG. 7 is structurally distinct from the retention sleeve 26 depicted in FIG. 1, the retention clip 100 serves a similar purpose to that of the retention sleeve 26 and interacts with mounting plate assembly 10, including the retention holes 19, similar to the retention sleeve 26. Accordingly, the retention clip 100 may arrest the spring clamp structure 18 at one or more locations in the guide slot 16. It is also appreciated that the circular embodiment of the mounting plate assembly 10 depicted in FIG. 7 is not limited to using a retention clip 100, and the rectangular embodiment of the mounting plate assembly 10 depicted in FIG. 1 is not limited to using a retention sleeve 26.

As depicted in FIGS. 8 and 10, the retention clip 100 may be attached to the spring clamp structure 18 with a screw 29. It is appreciated that the retention clip 100 may be formed as a single piece or may be formed from multiple parts. For example, the retention clip 100 may be stamped from a single piece of metal, or it may be composed of two or more pieces which may be joined together physically and/or joined at a point of attachment with the spring clamp structure 18. It is appreciated that the retention clip 100 may alternatively and/or additionally be attached to the spring clamp structure 18 using mold integration, friction integration, or other means of attachment which may or may not include a screw 29.

The retention clip screw 29, or other points of attachment referred to above, may be centered in front of the vertical bridge arm 21. It is appreciated that the retention clip 100 may be shaped, sized, and/or contoured in a variety of ways. Modifications to the retention clip 100 may, for example, permit the screw 29 to be off-center and/or located at a different point on the spring clamp structure 18. The retention clip 100 features projecting edges 102, which may be received by retention holes 19. The projecting edges 102 serve a similar purpose as the knobs 27 of the sliding sleeve/securing sleeve 26, in that both are arresting formations. When the projecting edges 102 interface with the retention holes 19, the spring clamp structure 18 is arrested at a predefined point in the guide slot 16. It is appreciated that structural distinctions among sliding sleeves 26 and retention clips 100 may require retention holes 19 to be correspondingly shaped to receive portions of the structures.

The retention clip 100 also features moulded ends 104, wherein the moulded ends 104 may be located at portions of the retention clip 100 distal from the screw 29, for example, the ends of the retention clip 100. The moulded ends 104 permit ergonomic application and distribution of opposing force(s), which may be necessary to overcome natural spring force(s) of the retention clip 100, wherein the natural spring force(s) urge the retention clip projecting edges 102 into recessed holes 19 when the edges 102 and holes 19 are aligned. Accordingly, it is appreciated that retention clip 100 does not require tools to be manipulated into and/or out of retention holes 19.

Referring to FIG. 9, the retention clip 100 may be operable by applying opposing force(s) (e.g. pinching) on the moulded ends 104 towards the bracket 20, causing the projecting edges 102 to move out of the retention holes 19. The application of opposing force(s) may need to overcome the natural spring force(s) of the retention clip 100 which naturally forces the projecting edges 102 downwards towards the mounting plate 13 and/or retention holes 19 when the spring clamp structure 18 is vertically secured in the guide slot 16. Opposing force(s) may overcome the natural spring force(s), permitting displacement of the spring clamp structure 18 in the guide slot 16, i.e., enabling rotation and movement within the guide slot 16. Conversely, if the projecting edges 102 are aligned with the retention holes 19, the natural spring force(s) of the retention clip 100 may cause the projecting edges 102 of the retention clip 100 to be received in the retention holes 19, wherein receipt of the projecting edges 102 into the retention holes 19 secures the spring clamp structure 18 in a position defined by the retention holes 19.

As mentioned herein above, the mounting plate assembly 10 may be provided to mount various types of fixtures, such as light fixtures, motion detectors, cameras or motions detectors and cameras combined with light fixtures. However, it is also conceivable that the mounting plate assembly may be utilized to mount other devices in a ceiling or wall and not necessarily in existing holes formed therein but in newly formed holes.

Many other modifications and other embodiments of the disclosure as described above will come to mind to a person skilled in the art to which the disclosure pertains having the benefit of the teachings of the embodiment described herein above and the drawings. Components and features of embodiments discussed herein may be interchangeable and/or combined, as would be appreciated by one having ordinary skill in the art. Hence, it is to be understood that the embodiments of the disclosure are not to be limited to the specific examples thereof as described herein and other embodiments are intended to be included within the scope of the disclosure and the appended claims. Although the foregoing descriptions and associated drawings describe example embodiments in the context of certain examples of the elements and members and/or functions, it should be understood that different combinations of elements or substitutes and/or functions may be provided by different embodiments without departing from the scope of the disclosure as defined by the appended claims. Furthermore, although specific terms are employed herein, they are used in a generic and descriptive sense only and other equivalent terms are contemplated herein with respect to the items that they relate to. It is therefore within the ambit of the disclosure to encompass all obvious modifications of the examples of the embodiments described herein provide such modifications fall within the scope of the appended claims.

The invention claimed is:

1. A mounting plate assembly, comprising:
   a mounting plate having an aperture to provide a passage therethrough;
   a guide slot;
   a spring clamp structure displaceably engageable with the guide slot;
   two or more spaced-apart retention formations in the mounting plate disposed at predetermined spaced locations adjacent to the guide slot;
   the spring clamp structure having a spring support bracket, the spring support bracket having a bottom retention base displaceably retained captive by the guide slot;
   a spring biased clamp arm secured to the spring support bracket, the spring support bracket having a securing sleeve slidingly couplable to the two or more spaced-apart retention formations, the securing sleeve having one or more arresting formations at a lower end thereof for retention coupling with selected ones of the two or more spaced-apart retention formations disposed spaced-apart along the guide slot;
   the spring support bracket being displaceable along the guide slot with the securing sleeve disposed at a disengaged position;
   the spring support bracket being securable along the guide slot with the securing sleeve disposed at an engageable position,
   wherein the securing sleeve is at the engageable position when the arresting formations are engageable with two or more spaced-apart retention formations.

2. The mounting plate assembly as claimed in claim 1, wherein the spring support bracket is comprised of a vertical bridge arm, the securing sleeve being a sliding retention sleeve slidingly received by the vertical bridge arm.

3. The mounting plate assembly as claimed in claim 2, wherein one or more arresting formations are formed in a bottom end of the sliding retention sleeve for removable coupling with a selected one of the two or more spaced-apart retention formations.

4. The mounting plate assembly as claimed in claim 3, wherein the vertical bridge arm is a flat substantially rectangular mounting plate bridge arm.

5. The mounting plate assembly as claimed in claim 4, wherein the sliding retention sleeve is dimensioned for close vertical sliding fit about the flat substantially rectangular mounting plate bridge arm.

6. The mounting plate assembly as claimed in claim 5, wherein the two or more spaced apart retention formations are spaced-apart retention holes formed on opposed sides of the guide slot.

7. The mounting plate assembly as claimed in claim 2, wherein the one or more arresting formations are constituted by a pair of downwardly projecting knobs formed in a bottom edge of the sliding retention sleeve with the projecting knobs disposed spaced-apart for engagement with a selected pair of the two or more spaced-apart retention holes.

8. The mounting plate assembly as claimed in claim 7, wherein the sliding retention sleeve is formed with a finger engaging projection.

9. The mounting plate assembly as claimed in claim 8, wherein the pair of spaced-apart retention formations and the pair of projecting knobs are shaped for close retention engagement with one another.

10. The mounting plate assembly as claimed in claim 1, wherein the bottom retention base of the spring support bracket includes a sliding support platform formation having a pair of slots for captive displacement in the guide slot, with each slot of the pair of slots receiving an edge portion of the mounting plate on opposed sides of the guide slot.

11. The mounting plate assembly as claimed in claim 10, wherein the bottom retention base is rotationally engageable and/or disengageable with the edge portions received in the pair of slots.

12. The mounting plate assembly as claimed in claim 11, wherein disengagement of the edge portions of the mounting plate with the pair of slots permits displacement of the spring clamp structure.

13. The mounting plate assembly as claimed in claim 4, wherein the flat rectangular mounting plate has a spring retention slot formed in a top portion thereof for retention of a torsion spring at an elevated position above the rear surface of the mounting plate, the torsion spring having a clamp arm section integrally formed therewith.

14. The mounting plate assembly as claimed in claim 13, wherein the clamp arm section is formed by straight spring arms sections at opposed ends of the torsion spring extending parallel to one another in a common plane and interconnected to one another at a free end by a surface engaging pad structure.

15. The mounting plate assembly as claimed in claim 4, wherein the flat substantially rectangular mounting plate bridge arm and the sliding sleeve are molded and/or casted parts.

16. The mounting plate assembly as claimed in claim 1, wherein the mounting plate is further provided with junction box attachment slots disposed on two spaced apart circumferential axis spaced from the aperture to provide connection to junction boxes of two different diameters for connection thereto by screw fasteners.

17. A mounting plate assembly, comprising:
a mounting plate;
a guide slot;
two or more spaced apart retention formations in the mounting plate disposed at spaced locations adjacent to the guide slot;
a spring clamp structure that is displaceably engageable with the guide slot over a rear face of the mounting plate, the spring clamp structure having a spring support bracket, the spring support bracket having a bottom retention base displaceably retained captive in the guide slot;
the spring support bracket having a retention member couplable to the two of more spaced-apart retention formations, the retention member having one or more arresting formations extending from an end thereof for retention coupling with selected one of the two or more spaced-apart retention formations disposed along the guide slot, the retention member partially enveloping, and being slidingly received by, a vertical bridge arm of the spring support bracket;
the spring support bracket being displaceable along the guide slot with the retention member disposed at a disengaged position;
the spring support bracket being securable along the guide slot with the retention member disposed at an engageable position,
wherein the retention member is at the engageable position when the arresting formations are engageable with two or more spaced-apart retention formations.

18. The mounting plate assembly as claimed in claim 17, wherein the bottom retention base includes a pair of slots for captive displacement in the guide slot, each slot of the pair of slots receiving an edge portion of the mounting plate on opposed sides of the guide slot.

19. A mounting plate assembly, comprising:
a mounting plate;
a guide slot;
two or more spaced apart retention formations that are located adjacent to the guide slot;
a spring clamp structure displaceably engageable with the guide slot over a rear face of the mounting plate,
the spring clamp structure having a bottom retention base displaceably retained captive by the guide slot, and
the spring clamp structure also having a spring support bracket and a retention member for retention coupling with selected one or more spaced- apart retention formations disposed along the guide slot,
wherein the retention member partially envelopes, and is slidingly received by, a vertical bridge arm of the spring support bracket.

20. The mounting plate assembly as claimed in claim 19, wherein
the spring support bracket is displaceable along the guide slot with the retention member disposed at a disengaged position;
the spring support bracket is securable along the guide slot with the retention member disposed at an engageable position,
wherein the retention member is at the engageable position when the arresting formations are engageable with two or more spaced-apart retention formations.

* * * * *